US012222097B2

United States Patent
Haenen et al.

(10) Patent No.: US 12,222,097 B2
(45) Date of Patent: Feb. 11, 2025

(54) LIGHTING SYSTEM

(71) Applicant: SIGNIFY HOLDING B.V., Eindhoven (NL)

(72) Inventors: Ludovicus Johannes Lambertus Haenen, Sint Oedenrode (NL); Olexandr Valentynovych Vdovin, Maarheeze (NL); Hugo Johan Cornelissen, Escharen (NL); Martinus Petrus Joseph Peeters, Weert (NL)

(73) Assignee: SIGNIFY HOLDING, B.V., Eindhoven (NL)

(*) Notice: Subject to any disclaimer, the term of this patent is extended or adjusted under 35 U.S.C. 154(b) by 0 days.

(21) Appl. No.: 18/691,230

(22) PCT Filed: Sep. 12, 2022

(86) PCT No.: PCT/EP2022/075266
§ 371 (c)(1),
(2) Date: Mar. 12, 2024

(87) PCT Pub. No.: WO2023/041480
PCT Pub. Date: Mar. 23, 2023

(65) Prior Publication Data
US 2024/0410547 A1 Dec. 12, 2024

(30) Foreign Application Priority Data
Sep. 14, 2021 (EP) ..................................... 21196589

(51) Int. Cl.
*F21V 5/00* (2018.01)
*F21Y 105/12* (2016.01)
(Continued)

(52) U.S. Cl.
CPC ........... *F21V 5/007* (2013.01); *F21Y 2105/12* (2016.08); *F21Y 2115/10* (2016.08); *F21Y 2115/30* (2016.08)

(58) Field of Classification Search
CPC ... F21V 5/007; F21Y 2105/12; G03B 3/0056; G02B 19/0057
See application file for complete search history.

(56) References Cited

U.S. PATENT DOCUMENTS

| 9,541,819 B2* | 1/2017 | Akiyama | ............. G03B 21/208 |
| 2017/0146204 A1* | 5/2017 | Di Trapani | ............... F21V 7/06 |

(Continued)

FOREIGN PATENT DOCUMENTS

| EP | 03623851 B1 | 6/2021 |
| WO | 2020089246 A1 | 5/2020 |

*Primary Examiner* — Tracie Y Green
*Assistant Examiner* — Michael Chiang

(57) ABSTRACT

The invention provides a lighting system (1000), wherein the lighting system (1000) comprises np system sections (100), wherein $n_f \geq 2$, wherein each system section (100) comprises a light source array section (110), a collimator section (120), and a Koehler integrator section (130), wherein: for each of the system sections (100) applies: the light source array section (110) comprises a plurality of section light sources (10) configured to provide light source light (11); the Koehler integrator section (120) comprises a section entrance face (131) and a section exit face (136), wherein the section entrance face comprises a plurality of section entrance lenslets (132) shaped according to an section entrance surface pattern (31), and wherein the section exit face (136) comprises a plurality of section exit lenslets (137) shaped according to a section exit surface pattern (36), and wherein the section entrance face (131) is configured in a light receiving relationship with the plurality of section light sources (10) via the collimator section (120); each of the plurality of section light sources (10) have a light emitting surface (15), wherein the light emitting surface (15) has a first axis of elongation A1 and an aspect ratio RS, wherein RS>1; each first axis of elongation A1 has an angle $\alpha A_1$ to an averaged first direction of the axes of elongation A1, wherein $\alpha 1 \leq 5°$; the section entrance surface pattern (31)

(Continued)

comprises a section entrance tessellation (33) of an entrance lenslet shape, wherein the entrance lenslet shape has a rotational symmetry of order nA, wherein $n_A \geq 2$, wherein the entrance lenslet shape has an entrance aspect ratio R1 and wherein R1≤RS; the section exit surface pattern (36) comprises a section exit tessellation (37) of an exit lenslet shape, wherein the exit lenslet shape approximates the light emitting surface (15), wherein the exit lenslet shape has an exit aspect ratio R2, wherein R2 is selected from the range of 0.8*RS–1.2*RS; and at least two system sections (100) of the system sections (100) are rotated relative to another for $360°/n_A/k+(360/n_A)*n_I$, wherein m is a non-negative integer, and wherein k is selected from the range of 2-12.

15 Claims, 7 Drawing Sheets

(51) Int. Cl.
  *F21Y 115/10* (2016.01)
  *F21Y 115/30* (2016.01)

(56) References Cited

U.S. PATENT DOCUMENTS

| | | |
|---|---|---|
| 2018/0017717 A1 | 1/2018 | Dross |
| 2022/0107486 A1* | 4/2022 | Boonekamp ............ F21K 9/233 |

* cited by examiner

LIGHTING SYSTEM

CROSS-REFERENCE TO PRIOR APPLICATIONS

This application is the U.S. National Phase application under 35 U.S.C. § 371 of International Application No. PCT/EP2022/075266, filed on Sep. 12, 2022, which claims the benefit of European Patent Application No. 21196589.2, filed on Sep. 14, 2021. These applications are hereby incorporated by reference herein.

FIELD OF THE INVENTION

The invention relates to a lighting system. The invention further relates to a light generating device comprising the lighting system.

BACKGROUND OF THE INVENTION

Lighting systems with beam tuning features are known in the art. For instance, EP3623851B1 describes an optical beam shaping element for shaping and homogenizing a beam, with an array of microlenses which have a respective vertex, the lateral positions of the microlenses in the array, based on the respective vertex, being predetermined on the basis of a regular pattern. The regular pattern defines respective reference positions for the vertex of a respective microlens, the reference positions each forming the center of a predetermined respective distribution area, and the lateral positions being arranged according to a predetermined first stochastic distribution function within the respective distribution area. The microlenses have at least one respective phase shift feature which is selected such that the microlenses generate a respective phase shift for light passing through, the respective phase shifts generated by the microlenses differing from one another according to at least one predetermined second stochastic distribution function.

US2017/146204A1 discloses an optical system for receiving and collimating light, wherein the optical system comprises a collimation unit comprising at least one parabolic interface that defines an inlet opening and an outlet opening, wherein the at least one parabolic interface is configured to reflect light entering through the inlet opening through the outlet opening and limit the angular spread of the light to an acceptance angle associated with the at least one parabolic interface. The optical system further comprises a homogenization unit for homogenizing the light emerging from the collimation unit, the homogenization unit comprising a lens array with pairs of a first lens and a second lens, wherein the lens array is configured such that light from the outlet opening collected by a first lens illuminates the respective second lens to provide for a continuously emitting output aperture.

SUMMARY OF THE INVENTION

In the entertainment business a lot of different spots may be used. They may range in flux from 5 klm till above 100 klm, very wide beams till very narrow high intensity spots, colored tunable beams and more. These spots may, for instance, also be used for sport events. In the past, entertainment spots with HID sources may have been dominant but today LED sources may be becoming increasingly relevant in this sector.

However, prior art lighting systems may be limited in color tuning and/or in beam-shaping. For instance, prior art systems, especially narrow beam high flux systems, may provide a beam with low CRI. Further, the prior art systems may be limited in beam shaping abilities and may, for instance, be unsuitable for providing a smooth round beam.

In particular, the source aspect ratio of high brightness LED sources used in entertainment applications may have aspect ratios up to about 1.8.

For laser-based phosphor converted light sources the light emitting area of the source may be defined by illumination profile of the pumping laser, and may typically have an elliptical shape with a non-uniform luminance and non-uniform spatial color distribution.

Such asymmetric and non-uniform sources may make it challenging to create round symmetric beams (using standard optics).

Further, for entertainment lighting applications, such as in narrow beam high flux applications, it may be desired to have a sustainable solid state light sources with high brightness and long lifetime, able to replace currently dominating HID lamps. However, the available laser-based light sources may be limited by low CRI (~70).

It may further be desired to achieve high CRI while maintaining a high brightness and a high optical efficiency.

Hence, it is an aspect of the invention to provide an alternative lighting system, which preferably further at least partly obviates one or more of above-described draw backs. The present invention may have as object to overcome or ameliorate at least one of the disadvantages of the prior art, or to provide a useful alternative.

Hence, in a first aspect the invention may provide a lighting system configured for providing a shaped light beam having a predefined shape. The lighting system may comprise $n_F$ system sections, especially wherein $n_F=1$, or especially wherein $n_F \geq 2$. In embodiments, each system section may comprise a light source array section, a collimator section, and a Koehler integrator section. In further embodiments, for each system section may apply that the (respective) light source array section may comprise a plurality of (array) section light sources configured to provide light source light. In further embodiments, for each system section may apply that the (respective) Koehler integrator section comprises a section entrance face and a section exit face, especially wherein the section entrance face comprises a plurality of section entrance lenslets shaped according to a section entrance surface pattern, and especially wherein the section exit face comprises a plurality of section exit lenslets shaped according to a section exit surface pattern. In further embodiments, the section entrance face may be configured in a light receiving relationship with the plurality of section light sources via the collimator section. In further embodiments, for each system section may apply that (each of) the plurality of section light sources, especially light emitting surfaces of the section light sources, have a (same) light emitting surface, wherein the light emitting surface has a first axis of elongation A1 and an aspect ratio RS, wherein RS>1. In further embodiments, for each system section may apply that each first axis of elongation A1 (of the light emitting surfaces of the plurality of section light sources in the respective system section) has an angle $\alpha_{A1}$ to a (mean) averaged first direction of the axes of elongation A1 (of the light emitting surfaces of the plurality of section light sources), wherein $\alpha_{A1} \leq 5°$. In further embodiments, for each system section may apply that the section entrance surface pattern comprises a section entrance tessellation of an entrance lenslet shape. In embodiments, the entrance lenslet shape may have a rotational symmetry of order $n_A$, especially wherein $n_A \geq 2$. In further embodiments, the entrance lenslet shape may have an entrance aspect ratio R1, especially wherein R1≤ RS. In further embodiments, for each system section may apply that the section exit surface pattern comprises a section exit tessellation of an exit lenslet shape, especially wherein the exit lenslet shape approximates (a shape of) the light emitting surfaces. In further embodiments, the exit lenslet shape may have an exit aspect ratio R2, wherein R2 may be selected from the range of 0.7*RS-1.3*RS, especially from the range of 0.8*RS-1.2*RS.

In embodiments, wherein $n_F$≥2, at least two system sections of the system sections may be rotated relative to another for a rotation angle αR (with respect to an optical axis O of the lighting system), especially wherein (αR 360°/$n_A$)/k+360/$n_A$*$n_I$, for improving the roundedness of the beam of light, wherein $n_I$ is a non-negative integer, especially wherein k is selected from the range of 2-12, such as from the range of 2-8, especially from the range of 2-4. In particular, if, for example, the entrance lenslet shape is a regular hexagon, a rotation of (360/$n_A$)/2 (30°) of a vertically oriented hexagon would result in a horizontally oriented hexagon. In contrast, a rotation of 360°/$n_A$=60° ($n_A$=6) of the entrance lenslet shape would result in the same orientation, i.e., the change is effectively not rotated (with respect to an external reference point). Hence, with respect to a hexagonal entrance lenslet shape a rotation of 30° may be (essentially) identical to a rotation of 90°. However, for example, with respect to rectangular light sources, a rotation of 30° may provide a different result than a rotation of 90°. Hence, in embodiments, $α_R$ may be selected such that $α_R$ is not a multiple of 360°/$n_A$, such that the entrance lenslet shapes of the different system sections 100 are arranged at an angle (i.e., are not arranged in parallel).

In further embodiments, k may be at least $n_F$/2, especially at least $n_F$. In further embodiments, k may be at most $n_F$. Hence, in embodiments, $α_R$ may be (360°/$n_A$)/$n_F$+360/$n_A$*$n_I$.

In particular, the lighting system of the invention may facilitate substantially increasing the efficiency of either LED or laser-based sources with aspect ratio different from 1, at least partially by matching the exit aspect ratio R2 with the aspect ratio RS. Further, the lighting system of the invention may facilitate beam shaping, such as to provide a nice smooth round spot, by rotating system sections relative to one another.

For example, if a round beam would be required, like it often is in the entertainment business, images of the section light sources may be focused on the lenses of the section exit face, wherein the exit aspect ratio R2 (roughly) matches the aspect ratio of the section light sources to prevent etendue losses. In particular, the shape of the beam may be at least partially controlled by the entrance lenslet shape. For instance, in an embodiment with two system sections ($n_F$=2), and with a (regular) hexagonal entrance lenslet shape, having the two system sections rotated by about 30 degrees ((360/$n_F$)/$n_A$) to each other, may provide a nearly round beam. The roundedness of the beam may be further improved by adding additional system sections, especially wherein each system section is rotated relative to each other system section, while maintaining the high system efficiency.

With respect to color tuning, the lighting system of the invention may facilitate increasing the CRI by arranging second section light sources, different from the section light sources, in the light source array section. In particular, in embodiments, the second section light sources may comprise one or more phosphor-based light sources and/or one or more red emitters (like red lasers). In particular, in embodiments, the section light source array may comprise spatially separated section light sources and second section light sources, wherein the section light sources comprise cool white laser-based emitters, and wherein the second section light sources comprise a red emitter. In particular, the lighting system may facilitate optical combining and mixing of light from these section light sources and second section light sources. In particular, the lighting system may comprise a first lens array section (of a collimator section) in close proximity to LED and laser-based sources, and a second lens array section (of the collimator section) arranged downstream of the first lens array section. In particular, the lighting system may comprise a collimator section comprising a first lens array section and a second lens array section, wherein the first lens array section is arranged (close to the light source array section) to capture the light source light, and wherein the second lens array section is arranged to parallelize (beams of) the light source light. In further embodiments, a Koehler integrator section may be arranged downstream from the collimator section, especially downstream from the second lens array section of the collimator section, especially wherein the exit aspect ratio R2 is aligned with the aspect ratio RS.

In particular, the entrance section face may be arranged downstream of the collimator section, and the section exit face may be arranged downstream of the section entrance face (with respect to the section light sources).

Hence, in specific embodiments, the invention may provide a lighting system, wherein the lighting system comprises nF system sections, wherein nF≥2, wherein each system section comprises a light source array section, a collimator section, and a Koehler integrator section, wherein at least two system sections of the system sections are rotated relative to another for ≤(360°/$n_A$)/k+(360°/$n_A$)*$n_I$, wherein k is selected from the range of 2-12, and wherein $n_I$ is a non-negative integer, and wherein for each of the system sections applies that: the light source array section comprises a plurality of section light sources configured to provide light source light: the Koehler integrator section comprises a section entrance face and a section exit face, wherein the section entrance face comprises a plurality of section entrance lenslets shaped according to an section entrance surface pattern, and wherein the section exit face comprises a plurality of section exit lenslets shaped according to a section exit surface pattern, and wherein the section entrance face is configured in a light receiving relationship with the plurality of section light sources via the collimator section; the plurality of section light sources have a (respective) light emitting surface, wherein the light emitting surface has a first axis of elongation A1 and an aspect ratio RS, wherein RS>1; each first axis of elongation A1 has an angle $α_{A1}$ to an averaged first direction of the axes of elongation A1, wherein $α_{A1}$≤5°: the section entrance surface pattern comprises a section entrance tessellation of an entrance lenslet shape, wherein the entrance lenslet shape has a rotational symmetry of order $n_A$, wherein $n_A$≥2, wherein the entrance lenslet shape has an entrance aspect ratio R1, and wherein R1≤RS; the section exit surface pattern comprises a section exit tessellation of an exit lenslet shape, wherein the exit lenslet shape approximates (a shape of) the light emitting surface, wherein the exit lenslet shape has an exit aspect ratio R2, wherein R2 is selected from the range of 0.8*RS-1.2*RS. Particularly, on average (by number) an intersection between the (approximated) exit lenslet (shape) and the light emitting surface covers at least $s_1$% of the exit lenslet (shape), wherein $s_1$ is at least 90%, such as at least 95%, especially at least 98%, such as at least 99%, including 100%.

In further embodiments, the section entrance lenslets may comprise spherical (entrance) lenslets. In particular, the (spherical) section entrance lenslets may be arranged according to the entrance surface pattern and may, in a 2D view, have the entrance lenslet shape. Similarly, in embodiments, the section exit lenslets may comprise spherical (exit) lenslets. In particular, the (spherical) section exit lenslets may be arranged according to the exit surface pattern and may, in a 2D view, have the exit lenslet shape.

Hence, the invention may provide a lighting system, wherein the lighting system may especially be (configured) for providing a shaped light beam (having a predefined shape). The lighting system may further especially be (configured) for providing color mixing, especially to provide a beam having a Color Rendering Index (CRI)≥70, especially ≥75, such as ≥80, especially ≥85.

In embodiments, the lighting system may comprise $n_F$ system sections. In particular, the lighting system may facilitate color mixing with one or more ($n_F \geq 1$) system sections, and may (further) facilitate beam shaping, such as to provide a round beam, with two or more ($n_F \geq 2$) system sections. In particular, the number of system sections may partially determine the beam shapes that can be achieved, also in dependence on the entrance lenslet shape. For instance, with a hexagonal entrance lenslet shape, the roundedness of a beam provided by the lighting system may be improved with additional system sections, while for an elliptical entrance lenslet shape, increasing the number of system sections may initially result in a star shape with increasing number of corner vertices, which may eventually start overlapping resulting in a rounded shape. Hence, in embodiments, nF≥2, such as ≥3, especially ≥4. In further embodiments, $n_F \leq 8$, such as ≤6, especially ≤4.

In embodiments, each system section may comprise a light source array section, a collimator section, and a Koehler integrator section. In particular, each system section may be configured to provide system light, especially section light, by providing light source light to the Koehler integrator section via the collimator section.

In embodiments, the system light may comprise visible light, such as light comprising radiation having a wavelength in the range of 380-780 nm. In further embodiments, the system light may comprise UV light. In particular, a (focused) round beam of UV light may, in embodiments, be convenient for driving chemical reactions with UV light. More especially, in embodiments at least 85% of the spectral power of the system light is in the 380-780 nm wavelength region.

In embodiments, the collimator section may comprise a plurality of section collimator lenses. In particular, in further embodiments, for each section light source may apply that a subset of the section collimator lenses is focused on the section light source, especially wherein the subset of the section collimator lenses comprises ≥2 section collimator lenses, such as ≥4 section collimator lenses.

In further embodiments, the light source array section (of each system section) may comprise a plurality of (array) section light sources. The section light sources may especially be configured to provide light source light. In embodiments, the section light sources may be arranged in a (2D) array, i.e., the light source array section may comprise a (2D) array comprising the plurality of section light sources. In further embodiments, the section light sources may especially be configured to provide (cool) white light source light.

In further embodiments, the Koehler integrator section (of each system section) may comprise a section entrance face and a section exit face. In particular, the section entrance face may be configured in a light receiving relationship with the plurality of section light sources via the collimator section. Hence, the section entrance face may be arranged downstream from the collimator section with respect to the section light sources. Further, the section exit face may be arranged downstream from the section entrance face with respect to the light sources. In embodiments, the section entrance face may comprise a plurality of section entrance lenslets shaped according to a section entrance surface pattern. Similarly, in embodiments, the section exit face may comprise a plurality of section exit lenslets shaped according to a section exit surface pattern.

The phrase "shaped according to a pattern" and similar phrases, may herein especially refer to the shapes approximating, especially conforming to, at least part of the pattern. For instance, in embodiments, the entrance surface pattern may comprise a tessellating grid of hexagons. The section entrance face may, however, also be hexagonal, and may, for example, in specific embodiments, have rounded corners. Hence, at an edge of the section entrance face, the section entrance face may deviate from the entrance surface pattern. In embodiments, along the edges of the section entrance face, the section entrance lenslets may deviate from the entrance lenslet shape, such as comprise only part of the entrance lenslet shape. In further embodiments, along the edges of the section entrance face, the section entrance face may be (partially) devoid of the entrance lenslet shapes, i.e., the section entrance face may comprise a plurality of section entrance lenslets shaped according to the entrance surface pattern, especially wherein section entrance lenslets are only provided if the entire entrance lenslet shape fits on the section entrance face.

The term "approximate" and its conjugations herein, such as in "to approximate a shape", refers to being nearly identical to, especially identical to, the following term, for example a shape in a (regular) pattern. For example, an entrance lenslet may have a shape that is nearly identical to an entrance lenslet shape in the entrance face pattern, but for a defect. In particular, an object approximating a first shape may herein refer to: a first shape realization encompassing the object, wherein the first shape realization is defined as the smallest encompassing shape of the (2D or 3D, respectively) object wherein the first shape realization has the shape of the first shape, wherein a ratio of the area (volume) of the first shape realization to the area (volume) of the object is ≤1.1, such as ≤1.05, especially ≤1.02, such as ≤1.01, including 1. Further, if the dimensions of the first shape are defined, the term approximate may refer to the object and the first shape being superimposable (in 2D or 3D, respectively) such that an intersection between the object and the first shape covers at least s % of the object and at least s % of the shape, wherein s is at least 90%, such as at least 95%, especially at least 98%, such as at least 99%, including 100%.

In particular, in embodiments, the entrance face may comprise a plurality of section entrance lenslets shaped according to an entrance surface pattern, wherein each section entrance lenslet approximates an entrance lenslet shape in the entrance surface pattern, and wherein on average (by number) an intersection between the section entrance lenslet entrance and the approximated entrance lenslet shape covers at least $s_1$% of the section entrance lenslet and at least $s_1$% of the entrance lenslet shape, wherein $s_1$ is at least 90%, such as at least 95%, especially at least 98%, such as at least 99%, including 100%.

Similarly, in embodiments, the exit face may comprise a plurality of section exit lenslets shaped according to an exit surface pattern, wherein each section exit lenslet approximates an exit lenslet shape in the exit surface pattern, and wherein on average (by number) an intersection between the section exit lenslet exit and the approximated exit lenslet shape covers at least $s_1$% of the section exit lenslet and at least $s_1$% of the exit lenslet shape, wherein $s_1$ is at least 90%, such as at least 95%, especially at least 98%, such as at least 99%, including 100%.

In embodiments, the plurality of section light sources may comprise light emitting surfaces having (same) light emitting surface, especially same light emitting surface with same light emitting surface shapes, such as rectangular shapes. In particular, each section light source of the plurality of section light sources may comprise a light emitting surface having a light emitting surface shape, such as a rectangular light emitting surface shape. In embodiments, the light emitting surface may have a first axis of elongation A1 and an aspect ratio RS, especially wherein RS>1. In further embodiments, RS≥1.05, such as ≥1.1, especially ≥1.3. In further embodiments, RS≤5, such as ≤3, especially ≤2.

The term "aspect ratio" of a (2D) shape herein refers to the ratio of the longest side to the smallest side of the smallest rectangle realization encompassing the shape.

The section light sources may, in embodiments, (essentially) be arranged in parallel. In particular, the first axes of elongation of the section light sources may be arranged (essentially) in parallel. For example, for any two section light sources (in the same system section) an angle between their first axes of elongation may be ≤20°, such as ≤10°, especially ≤5°. In embodiments, for all sets of two section light sources (in the same system section) an angle between the first axes of elongation of the (respective) two section light sources may be ≤20°, such as ≤10°, especially ≤5°. In particular, the first axes of elongation of the section light sources may define a ("mean" or "number") averaged first direction of the axis of elongation, and each first axis of elongation A1 may have an angle $\alpha_{A1}$ to the averaged first direction, especially wherein $\alpha_{A1}$≤10°, such as ≤5°, especially ≤3°, such as ≤2°, including 0°.

Hence, in embodiments, each first axis of elongation A1 (of the light emitting surfaces shapes of the plurality of section light sources in the respective system section) may have an angle $\alpha_{A1}$ to a (mean) averaged first direction of the axes of elongation A1 (of the light emitting surfaces of the plurality of section light sources), especially wherein $\alpha_{A1}$≤5°.

In embodiments, the section entrance surface pattern may comprise a section entrance tessellation of an entrance lenslet shape, especially wherein the entrance lenslet shape is selected from the group comprising a hexagon and a rectangle, especially a rectangle, or especially a hexagon, such as a hexagon wherein each set of two opposite sides of the hexagon are arranged in parallel. In further embodiments, the entrance lenslet shape may comprise an elongated hexagon. In further embodiments, the entrance lenslet shape may comprise a regular polygon, especially a regular hexagon, or especially a square.

The term "tessellation" may herein especially refer to a pattern of (repeated) shapes, especially polygons, that fit together closely without gaps or overlapping.

In embodiments, the entrance tessellation may comprise a translation tessellation of the entrance lenslet shape. The term "translation tessellation" may herein especially refer to a tessellation wherein the tessellated shape—such as the entrance lenslet shape—is moved without rotation or mirroring thereof.

The entrance lenslet shape may, in embodiments, a rotational symmetry of order $n_A$, especially wherein $n_A$≥2, such as ≥3, especially ≥4. In further embodiments, $n_A$≥6, especially wherein $n_A$=6. The order $n_A$ may especially refer to the highest order of rotational symmetry of the entrance lenslet shape. In particular, the order of rotational symmetry of a shape may herein refer to the number of times the shape repeats itself during a full rotation of 360 degrees around an axis perpendicular to the plane of this two-dimensional shape (rotational symmetry axis). For instance, a regular hexagon may have an order of rotational symmetry of six. Hence, the term "rotational symmetry of order $n_A$" may refer to the entrance lenslet shape having a (highest) $n_A$-fold symmetry axis of rotation.

In embodiments, the entrance lenslet shape may have an entrance aspect ratio R1, especially wherein R1≤RS. In further embodiments, R1≤1.25, especially ≤1.2, such as ≤1.155, especially ≤1.1, including 1.

In specific embodiments, $\alpha_{A1}$≤1°, RS≥1.3, and R1≤1.2.

In embodiments, the section exit surface pattern may comprise a section exit tessellation of an exit lenslet shape. In embodiments, the exit lenslet shape may especially comprise a shape selected from the group comprising a rectangle, an ellipse, and a (stretched) hexagon. In particular, in embodiments, the exit lenslet shape may approximate (a shape of) the light emitting surface. Especially, in embodiments, the exit lenslet shape and the light emitting surface may comprise the same shape, especially wherein the exit lenslet shape (or the section exit lenslet) and the light emitting surface have the same dimensions. For instance, in embodiments, the light emitting surface may be shaped as a rectangle, and the exit lenslet shape may (also) be a rectangle.

In particular, the exit lenslet shape (or the section exit lenslet) and the light emitting surface may be (essentially) arranged in parallel. In embodiments, the exit lenslet shape may have second axes of elongation A2. In particular, each second axis of elongation A2 may have an angle $\alpha_{A2}$ to the (mean) averaged first direction (defined by the first axes of elongation A1), especially wherein $\alpha_{A2}$≤10°, such as ≤5°, especially ≤3°, such as ≤2°, including 0°.

In further embodiments, the second axes of elongation may (essentially) be arranged in parallel (to one another). Hence, in embodiments, the section exit surface pattern may comprise a translation tessellation of the exit lenslet shape.

In further embodiments, the exit lenslet shape may have an exit aspect ratio R2, especially wherein R2 is selected from the range of 0.8*RS-1.2*RS, especially from the range of 0.9*RS-1.1*RS, such as (about) RS. By matching the exit aspect ratio R2 to RS, the lighting efficiency may be improved. Similarly, by matching the exit lenslet shape to the (shape of) the light emitting surfaces, the lighting efficiency may be improved.

Hence, the entrance face of the Koehler integrator may (at least partially) determine the shape of the shaped light beam, whereas the exit face of the Koehler integrator may (at least partially) determine the lighting efficiency of the lighting system.

In further embodiments, at least two system sections of the system sections may be rotated relative to another for a rotation angle αR, especially with respect to an optical axis O of the lighting system, and especially wherein $\alpha R=360°/n_A/k+360°/n_A*n_I$, wherein k is selected from the range of 2-12, and wherein $n_I$ is a non-negative integer. In further embodiments, $\alpha R=360°/n_A/n_F+360°/n_A*n_I$. Thereby, the at least two system sections may be rotated such that one or more of their first axis of elongation A1, their second axes of elongation A2, and/or their entrance lenslet shapes are arranged at an angle. In particular, in embodiments, at least the entrance lenslet shapes may be arranged may be arranged at an angle smaller than $360°/n_A$.

In particular, in embodiments, the at least to system sections, especially all of the $n_F$ system sections, may be (essentially) identical. For instance, in embodiments, the section light sources of the system sections may be (essentially) identical. In further embodiments, the system sections may have (essentially) identical entrance lenslet shapes. In further embodiments, the system sections may have (essentially) identical exit lenslet shapes. Hence, in embodiments, the system sections may be essentially identical but may be rotated relative to one another. Thereby, a beam shape of a shaped light beam may be controlled. For instance, a single system section having a regular hexagonal entrance lenslet shape may provide a beam with a hexagonal shape. However, two such system sections rotated relative to one another for (about) 30° may provide a beam with a rounded shape (also see below). Similarly, three such system sections rotated relative to one another for (about 20°) may provide an even more rounded beam.

Hence, in further embodiments, $n_F \geq 3$, and each system section may be rotated relative to two other system sections for $\leq (360°/n_A)/n_F+(360°/n_A)*n_I$, especially for (about) $(360°/n_A)/n_F$. In further embodiments, $n_F \geq 4$, such as $\geq 6$. In further embodiments, each system section may be rotated relative to two other system sections for $\geq (360°/n_A)/n_F/2 + (360°/n_A)*n_I$.

Similarly, in further embodiments, $n_F=2$, and the (two) system sections are rotated relative to one another for at least $(360°/n_A)/n_F/2$ and at most $(360°/n_A)/n_F$, especially for (about) $(360°/n_A)/n_F$.

As indicated above, an increasing number of system sections may facilitate providing a more rounded beam (or other shapes). However, there may be diminishing returns, i.e., the difference between 1 or 2 system sections for the roundedness of a beam may be substantial, whereas the difference between 9 or 10 system sections for the roundedness of a beam may be (relatively) minor. Hence, in further embodiments, $n_F \leq 10$, such as $\leq 6$, especially $\leq 4$.

In embodiments, the shaped light beam may approximate a shape selected from the group comprising a circle, an ellipse, a rectangle, a hexagon, and a star. In further embodiments, the shaped light beam may especially comprise a circle.

Besides beam shaping, the lighting system of the invention may be particularly suitable for color mixing (and homogenization), such as to provide a high CRI, especially by mixing light (or radiation) from light sources with different aspect ratios. In particular, each system section may facilitate color mixing. Hence, also embodiments wherein $n_F=1$ may facilitate color mixing.

Hence, in embodiments, the light source array section, especially of each system section, may comprise a plurality of second section light sources configured to provide second light source light, especially wherein the light source light and the second light source light have different spectral distributions. In further embodiments, the second section light sources may have a (same) second light emitting surface. In particular, in embodiments, the second light emitting surface may have an aspect ratio RS2, especially wherein $RS2 \geq 1$, such as $\geq 1.05$, especially $\geq 1.1$. In further embodiments, $RS2 \leq 1.5$, especially $\leq 1.4$, such as $\leq 1.3$. In further embodiments, $RS2 \leq 1.1$, such as $\leq 1.05$, including 1.

In embodiments, the section light sources may comprise phosphor converted laser emitters or laser light sources, especially phosphor converted laser emitters, or especially laser light sources. In further embodiments, the second section light source may comprise light emitting diodes or (bare) laser sources functionally coupled with (respective) diffusers, especially light emitting diodes, or especially laser sources functionally coupled with (respective) diffusers. In further embodiments, the diffusers may have a diffuser exit face with an area a selected from the range of 0.8-1.2*the area of the light emitting surface (of the plurality of section light sources), especially from the range of 0.9-1.1*the area of the light emitting surface (of the plurality of section light sources).

In embodiments, the section light sources may be configured to provide (cool) white light source light, and the second section light sources may be configured to provide (red) second light source light, especially wherein the second light source light has a (dominant) wavelength in the range of 620-750 nm.

The addition of red second light source light may increase the CRI of the lighting system. A potential decrease in the color temperature (Tc) resulting from the red second light sources may be compensated by additional blue (second or third) light sources. In particular, the lighting system of the invention may facilitate color mixing of light source light from different light sources, which light sources may be selected in view of desired properties of resulting system light.

In further embodiments, the section light sources may comprise (cool white) phosphor converted laser emitters and the second section light sources may comprise red emitters, especially red emitting LEDs or lasers.

As indicated above, the lighting system may comprise a plurality of system sections, wherein each system section comprises a light source array section, a collimator section, and a Koehler integrator section. In particular, in embodiments, the light source array sections of the system sections may (together) form a light source array. Similarly, in embodiments, the collimator sections of the system sections may (together) form a collimator. Further, in embodiments, the Koehler integrator sections of the system sections may (together) form a Koehler integrator.

The term "Koehler integrator" (or "Köhler integrator") may herein refer to a beam shaping and homogenization element comprising two arrays of coupled lenslets focused on each other. Hence, each Koehler integrator section may comprise two arrays (corresponding to the entrance face and the exit face) comprising lenslets focused on each other, i.e., the section entrance lenslets and the section exit lenslets of a system section, especially of a Koehler integrator section, may be focused on each other.

As will be known to the person skilled in the art, a Koehler integrator may comprise one monolithic part or two separate parts divided by air. Hence, in embodiments, (each of) the Koehler integrator section(s) may comprise a monolithic part or, alternatively, (each of) the Koehler integrator section(s) may comprise a first part and a second part, wherein the first part comprises the entrance face, and wherein the second part comprises the exit face, and wherein the first part and the second part are physically separated.

In embodiments, the Koehler integrator may comprise a plurality of section entrance lenslets defining the entrance face, wherein the plurality of section entrance lenslets are shaped according to the entrance lenslet shapes in the entrance surface pattern, especially wherein the plurality of section entrance lenslets approximate the entrance lenslet shapes in the entrance surface pattern.

In embodiments, the lighting system may further comprise optics. The term "optics" may especially refer to (one or more) optical elements. The optics may include one or more or mirrors, reflectors, collimators, lenses, prisms, diffusers, phase plates, polarizers, diffractive elements, gratings, dichroics, arrays of one or more of the afore-mentioned, etc. Alternatively or additionally, the term "optics" may refer to a holographic element or a mixing rod. In embodiments, the optics may include one or more of beam expander optics and zoom lens optics.

In further embodiments, the lighting system may comprise a diffuser, especially arranged to (further) smoothen the (beam of) light source light. In particular, the diffuser may comprise VDI textures on (some of) an optics surface such that light is scattered for diffusion/smoothing of the beam.

In embodiments, the lighting system may comprise one or more of an entertainment lighting fixture, such as a spotlight, and an architectural lighting fixture.

In further embodiments, the lighting system may be applied in one or more of an entertainment lighting fixture and an architectural lighting fixture.

In a further aspect, the invention may provide a light generating device comprising the lighting system according to the invention. In embodiments, the light generating device may be selected from the group comprising a lamp, a luminaire, a projector device, a disinfection device, a stage lighting device, a chemical reaction stimulation device, and an optical wireless communication device, especially from the group comprising a lamp, a luminaire, a projector device, a stage lighting device, a chemical reaction stimulation device, and an optical wireless communication device. In further embodiments, the light generating device may comprise a stage lighting device, such as a spotlight. In further embodiments, the light generating device may comprise a chemical reaction stimulation device, i.e., a device configured to improve or accelerate a chemical reaction by providing (specific) light.

The terms "upstream" and "downstream" relate to an arrangement of items or features relative to the propagation of the light from a light generating means (here the especially the light source), wherein relative to a first position within a beam of light from the light generating means, a second position in the beam of light closer to the light generating means is "upstream", and a third position within the beam of light further away from the light generating means is "downstream".

The light generating system may be part of or may be applied in e.g. office lighting systems, household application systems, shop lighting systems, home lighting systems, accent lighting systems, spot lighting systems, theater lighting systems, fiber-optics application systems, projection systems, self-lit display systems, pixelated display systems, segmented display systems, warning sign systems, medical lighting application systems, indicator sign systems, decorative lighting systems, portable systems, automotive applications, (outdoor) road lighting systems, urban lighting systems, green house lighting systems, horticulture lighting, digital projection, or LCD backlighting. The light generating system (or luminaire) may be part of or may be applied in e.g. optical communication systems or disinfection systems.

As indicated above, the lighting unit may be used as backlighting unit in an LCD display device. Hence, the invention provides also an LCD display device comprising the lighting unit as defined herein, configured as backlighting unit. The invention also provides in a further aspect a liquid crystal display device comprising a back lighting unit, wherein the back lighting unit comprises one or more light generating systems as defined herein.

Preferably, the light source is a light source that during operation emits (light source light) at least light at a wavelength selected from the range of 200-490 nm, especially a light source that during operation emits at least light at wavelength selected from the range of 400-490 nm, even more especially in the range of 440-490 nm. This light may partially be used by the wavelength converter nanoparticles (see further also below). Hence, in a specific embodiment, the light source is configured to generate blue light.

The term "white light" herein, is known to the person skilled in the art. It especially relates to light having a correlated color temperature (CCT) between about 1800 K and 20000 K, such as between 2000 and 20000 K, especially 2700-20000 K, for general lighting especially in the range of about 2700 K and 6500 K. In embodiments, for backlighting purposes the correlated color temperature (CCT) may especially be in the range of about 7000 K and 20000 K. Yet further, in embodiments the correlated color temperature (CCT) is especially within about 15 SDCM (standard deviation of color matching) from the BBL (black body locus), especially within about 10 SDCM from the BBL, even more especially within about 5 SDCM from the BBL.

In an embodiment, the light source may also provide light source light having a correlated color temperature (CCT) between about 5000 and 20000 K, e.g. direct phosphor converted LEDs (blue light emitting diode with thin layer of phosphor for e.g. obtaining of 10000 K). Hence, in a specific embodiment the light source is configured to provide light source light with a correlated color temperature in the range of 5000-20000 K, even more especially in the range of 6000-20000 K, such as 8000-20000 K. An advantage of the relative high color temperature may be that there may be a relatively high blue component in the light source light.

The terms "visible", "visible light" or "visible emission" and similar terms refer to light having one or more wavelengths in the range of about 380-780 nm. Herein, UV may especially refer to a wavelength selected from the range of 200-380 nm.

The terms "light" and "radiation" are herein interchangeably used, unless clear from the context that the term "light" only refers to visible light. The terms "light" and "radiation" may thus refer to UV radiation, visible light, and IR radiation. In specific embodiments, especially for lighting applications, the terms "light" and "radiation" refer to (at least) visible light.

The terms "violet light" or "violet emission" especially relates to light having a wavelength in the range of about 380-440 nm. The terms "blue light" or "blue emission" especially relates to light having a wavelength in the range of about 440-495 nm (including some violet and cyan hues). The terms "green light" or "green emission" especially relate to light having a wavelength in the range of about 495-570 nm. The terms "yellow light" or "yellow emission" especially relate to light having a wavelength in the range of about 570-590 nm. The terms "orange light" or "orange emission" especially relate to light having a wavelength in the range of about 590-620 nm. The terms "red light" or "red emission" especially relate to light having a wavelength in the range of about 620-780 nm. The term "pink light" or "pink emission" refers to light having a blue and a red component. The term "cyan" may refer to one or more wavelengths selected from the range of about 490-520 nm. The term "amber" may refer to one or more wavelengths selected from the range of about 585-605 nm, such as about 590-600 nm.

The term "controlling" and similar terms especially refer at least to determining the behavior or supervising the running of an element. Hence, herein "controlling" and similar terms may e.g. refer to imposing behavior to the element (determining the behavior or supervising the running of an element), etc., such as e.g. measuring, displaying, actuating, opening, shifting, changing temperature, etc., Beyond that, the term "controlling" and similar terms may additionally include monitoring. Hence, the term "controlling" and similar terms may include imposing behavior on an element and also imposing behavior on an element and monitoring the element. The controlling of the element can be done with a control system, which may also be indicated as "controller". The control system and the element may thus at least temporarily, or permanently, functionally be coupled. The element may comprise the control system. In embodiments, the control system and element may not be physically coupled. Control can be done via wired and/or wireless control. The term "control system" may also refer to a plurality of different control systems, which especially are functionally coupled, and of which e.g. one control system may be a master control system and one or more others may be slave control systems. A control system may comprise or may be functionally coupled to a user interface.

The control system may also be configured to receive and execute instructions form a remote control. In embodiments, the control system may be controlled via an App on a device, such as a portable device, like a Smartphone or I-phone, a tablet, etc., The device is thus not necessarily coupled to the lighting system, but may be (temporarily) functionally coupled to the lighting system.

Hence, in embodiments the control system may (also) be configured to be controlled by an App on a remote device. In such embodiments the control system of the lighting system may be a slave control system or control in a slave mode. For instance, the lighting system may be identifiable with a code, especially a unique code for the respective lighting system. The control system of the lighting system may be configured to be controlled by an external control system which has access to the lighting system on the basis of knowledge (input by a user interface of with an optical sensor (e.g. QR code reader) of the (unique) code. The lighting system may also comprise means for communicating with other systems or devices, such as on the basis of Bluetooth, WIFI, LiFi, ZigBee, BLE or WiMAX, or another wireless technology.

The system, or apparatus, or device may execute an action in a "mode" or "operation mode" or "mode of operation" or "operational mode". The term "operational mode may also be indicated as "controlling mode". Likewise, in a method an action or stage, or step may be executed in a "mode" or "operation mode" or "mode of operation" or "operational mode". This does not exclude that the system, or apparatus, or device may also be adapted for providing another controlling mode, or a plurality of other controlling modes. Likewise, this may not exclude that before executing the mode and/or after executing the mode one or more other modes may be executed.

However, in embodiments a control system may be available, that is adapted to provide at least the controlling mode. Would other modes be available, the choice of such modes may especially be executed via a user interface, though other options, like executing a mode in dependence of a sensor signal or a (time) scheme, may also be possible. The operation mode may in embodiments also refer to a system, or apparatus, or device, that can only operate in a single operation mode (i.e. "on", without further tunability).

Hence, in embodiments, the control system may control in dependence of one or more of an input signal of a user interface, a sensor signal (of a sensor), and a timer. The term "timer" may refer to a clock and/or a predetermined time scheme.

In yet a further aspect, the invention also provides a lamp or a luminaire comprising the light generating system as defined herein. The luminaire may further comprise a housing, optical elements, louvres, etc. etc. The lamp or luminaire may further comprise a housing enclosing the light generating system. The lamp or luminaire may comprise a light window in the housing or a housing opening, through which the system light may escape from the housing. In yet a further aspect, the invention also provides a projection device comprising the light generating system as defined herein. Especially, a projection device or "projector" or "image projector" may be an optical device that projects an image (or moving images) onto a surface, such as e.g. a projection screen. The projection device may include one or more light generating systems such as described herein. Hence, in an aspect the invention also provides a light generating device selected from the group of a lamp, a luminaire, a projector device, a disinfection device, and an optical wireless communication device, comprising the light generating system as defined herein. The light generating device may comprise a housing or a carrier, configured to house or support, one or more elements of the light generating system. For instance, in embodiments the light generating device may comprise a housing or a carrier, configured to house or support the lighting system.

Instead of the terms "lighting device" or "lighting system", and similar terms, also the terms "light generating device" or "light generating system", (and similar terms), may be applied. A lighting device or a lighting system may be configured to generate device light (or "lighting device light") or system light ("or lighting system light"). As indicated above, the terms light and radiation may interchangeably be used.

The lighting device may comprise a light source. The device light may in embodiments comprise one or more of light source light and converted light source light (such as luminescent material light).

The lighting system may comprise a light source. The system light may in embodiments comprise one or more of light source light and converted light source light (such as luminescent material light).

The term UV radiation may in specific embodiments refer to near UV radiation (NUV). Therefore, herein also the term "(N) UV" is applied, to refer to in general UV, and in specific embodiments to NUV. The term IR radiation may in specific embodiments refer to near IR radiation (NIR). Therefore, herein also the term "(N) IR" is applied, to refer to in general IR, and in specific embodiments to NIR.

Herein, the term "visible light" especially relates to light having a wavelength selected from the range of 380-780 nm.

Herein, UV (ultraviolet) may especially refer to a wavelength selected from the range of 190-380 nm, though in specific embodiments other wavelengths may also be possible.

Herein, IR (infrared) may especially refer to radiation having a wavelength selected from the range of 780-3000 nm, such as 780-2000 nm, e.g. a wavelength up to about 1500 nm, like a wavelength of at least 900 nm, though in specific embodiments other wavelengths may also be possible. Hence, the term IR may herein refer to one or more of near infrared (NIR (or IR-A)) and short-wavelength infrared (SWIR (or IR-B)), especially NIR.

BRIEF DESCRIPTION OF THE DRAWINGS

Embodiments of the invention will now be described, by way of example only, with reference to the accompanying schematic drawings in which corresponding reference symbols indicate corresponding parts, and in which.

The schematic drawings are not necessarily to scale.

DETAILED DESCRIPTION OF THE EMBODIMENTS

Figure 1:
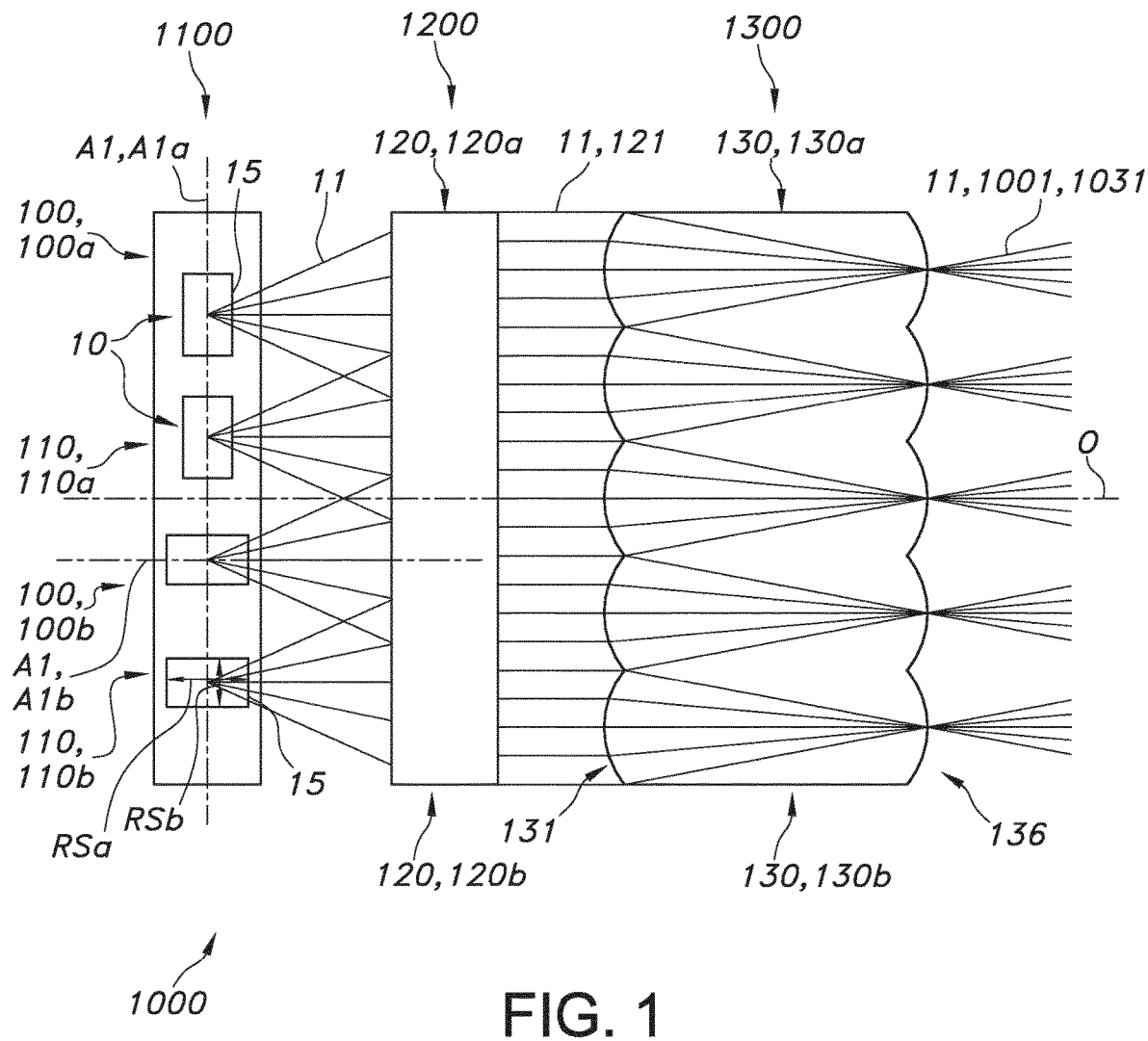
FIG. 1 schematically depicts an embodiment of the lighting system.

FIG. 1 schematically depicts a lighting system 1000 for providing system light 1001, especially for providing a shaped light beam 1031 (having a predefined shape). In the depicted embodiment, the lighting system 1000 comprises $n_F$ system sections 100, wherein $n_F \geq 2$. In particular, the optical axis O of the system may, in the depicted embodiment, (roughly) separate two system sections 100, 100*a*, 100*b*. Each system section 100 may comprise a light source array section 110, a collimator section 120, and a Koehler integrator section 130. In particular, FIG. 1 schematically depicts two light source array sections 110, 110*a*, 110*b*, two collimator sections 120, 120*a*, 120*b*, and two Koehler integrator sections 130, 130*a*, 130*b*.

In the depicted embodiment, the Koehler integrator sections 130 may be monolithic elements, i.e., the section entrance face 131 and the section exit face 136 are provided by a single monolithic element (for a single Koehler integrator section). In further embodiments, the Koehler integrator sections 130 may comprise two lens arrays separated by an airgap, i.e., the section entrance face 131 may be provided by a section entrance lenslet array, and the section exit face 136 may be provided by a section exit lenslet array, wherein the section entrance lenslet array and the section exit lenslet array are separated by air.

In embodiments, for each of the system sections may apply that the (respective) light source array section 110 comprises a plurality of (array) section light sources 10, wherein the section light sources 10 may be configured to provide light source light 11. For visualization purposes only the face of the light source array 1100 facing the collimator 1200 is depicted.

In further embodiments, for each of the system sections may apply that the (respective) Koehler integrator section 120 comprises a section entrance face 131 and a section exit face 136. In embodiments, the section entrance face may comprise a plurality of section entrance lenslets 132 shaped according to an section entrance surface pattern 31. Similarly, the section exit face 136 comprises a plurality of section exit lenslets 137 shaped according to a section exit surface pattern 36. In the depicted embodiment, the section entrance face 131 may be configured in a light receiving relationship with the plurality of section light sources 10 via the collimator section 120. In particular, the section entrance face 131 may be arranged downstream from the collimator section 120 with respect to the section light sources 10, and the section exit face 136 may be arranged downstream from the section entrance face 131 with respect to the section light sources 10.

In embodiments, for each of the system sections may apply that (each of) the plurality of section light sources 10 comprise light emitting surfaces 15. In particular, (each of) the plurality of section light sources, especially (each of) the light emitting surfaces 15, may have a (same) light emitting surface shape, especially wherein the light emitting surface shape has a first axis of elongation A1 and an aspect ratio RS. In embodiments, RS>1, such as ≥1.1, especially ≥1.2.

Figure 2A:
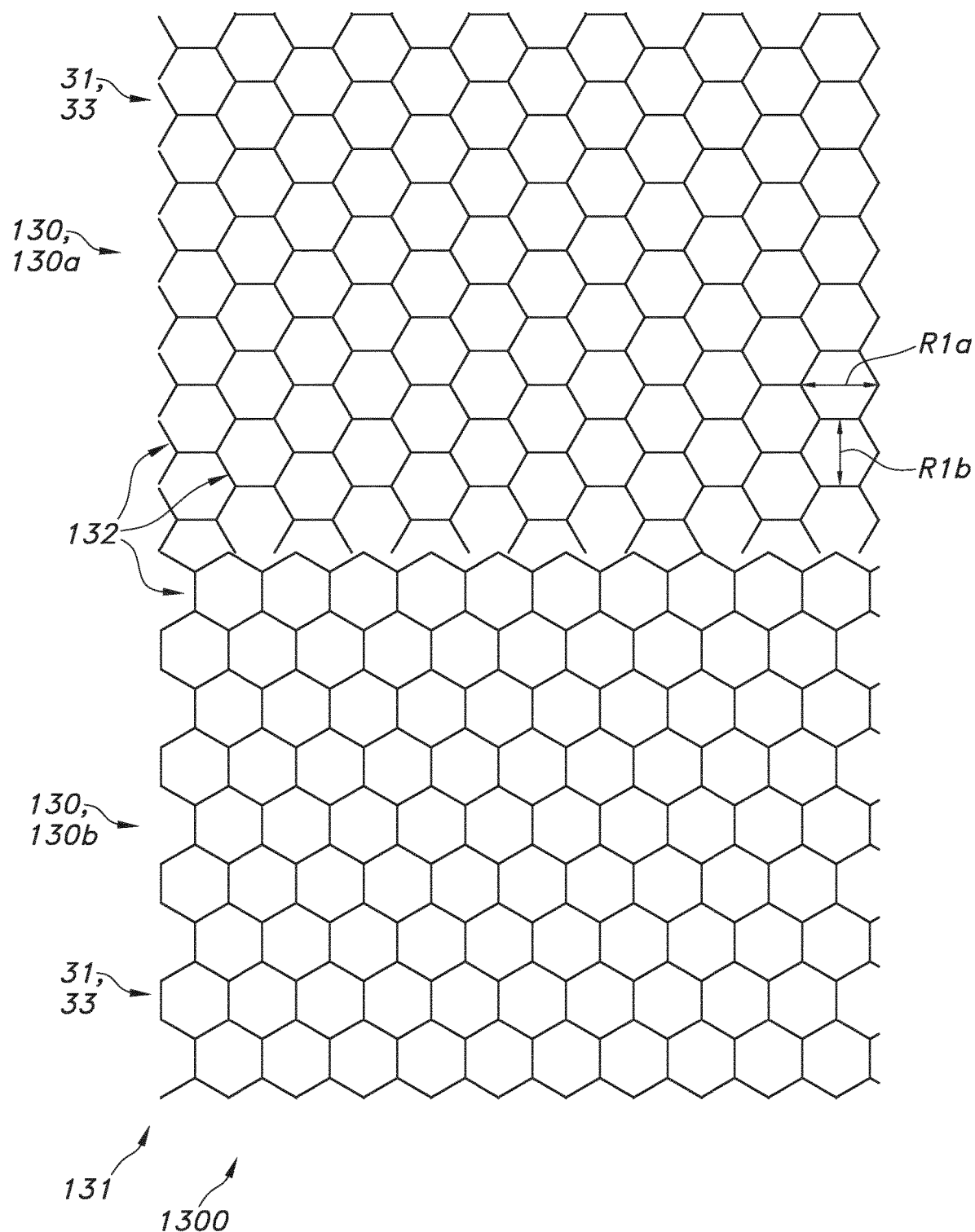
FIG. 2A-D schematically depict aspects of embodiments of the lighting system.
Figure 2B:
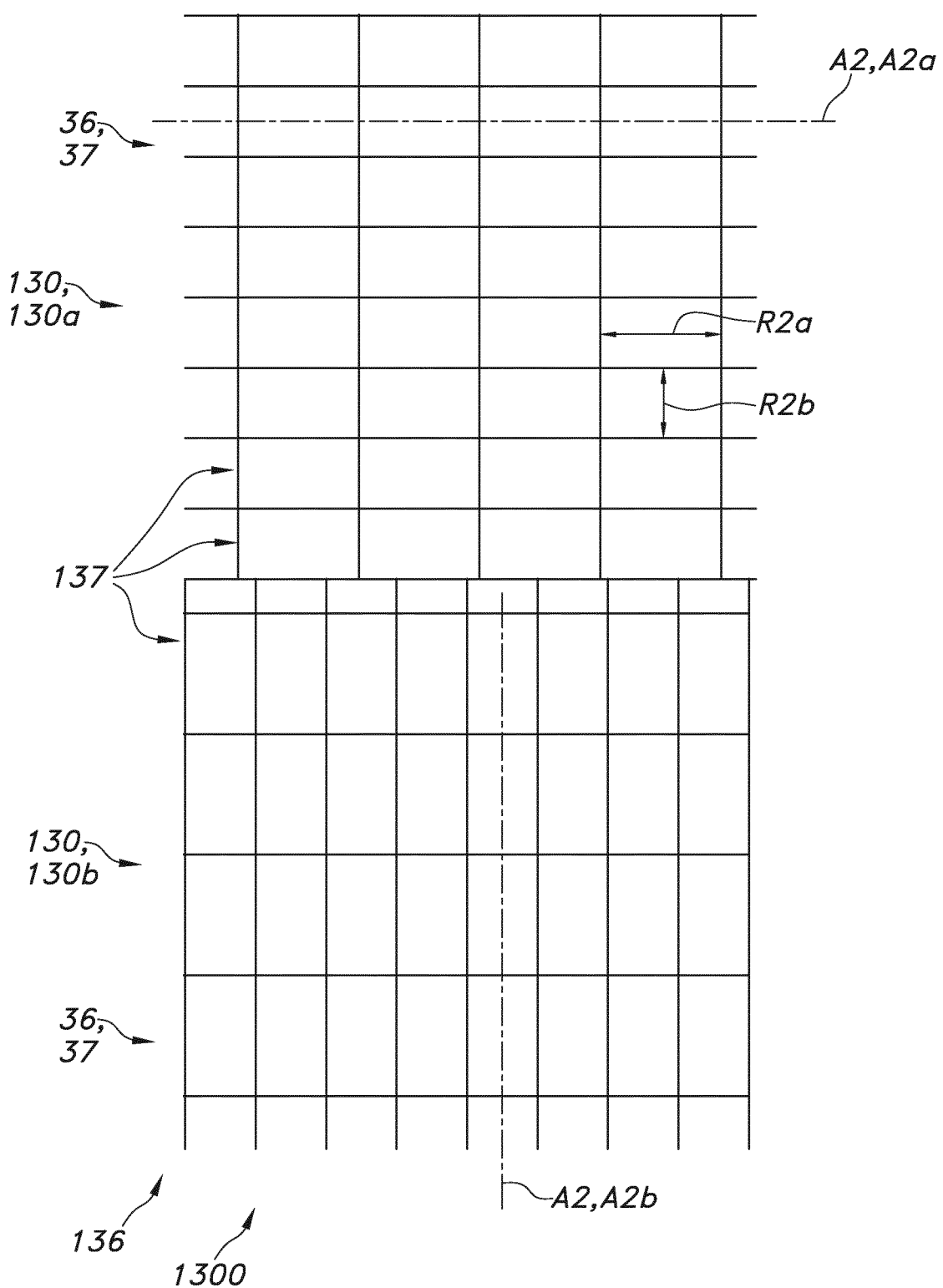
Figure 2C:
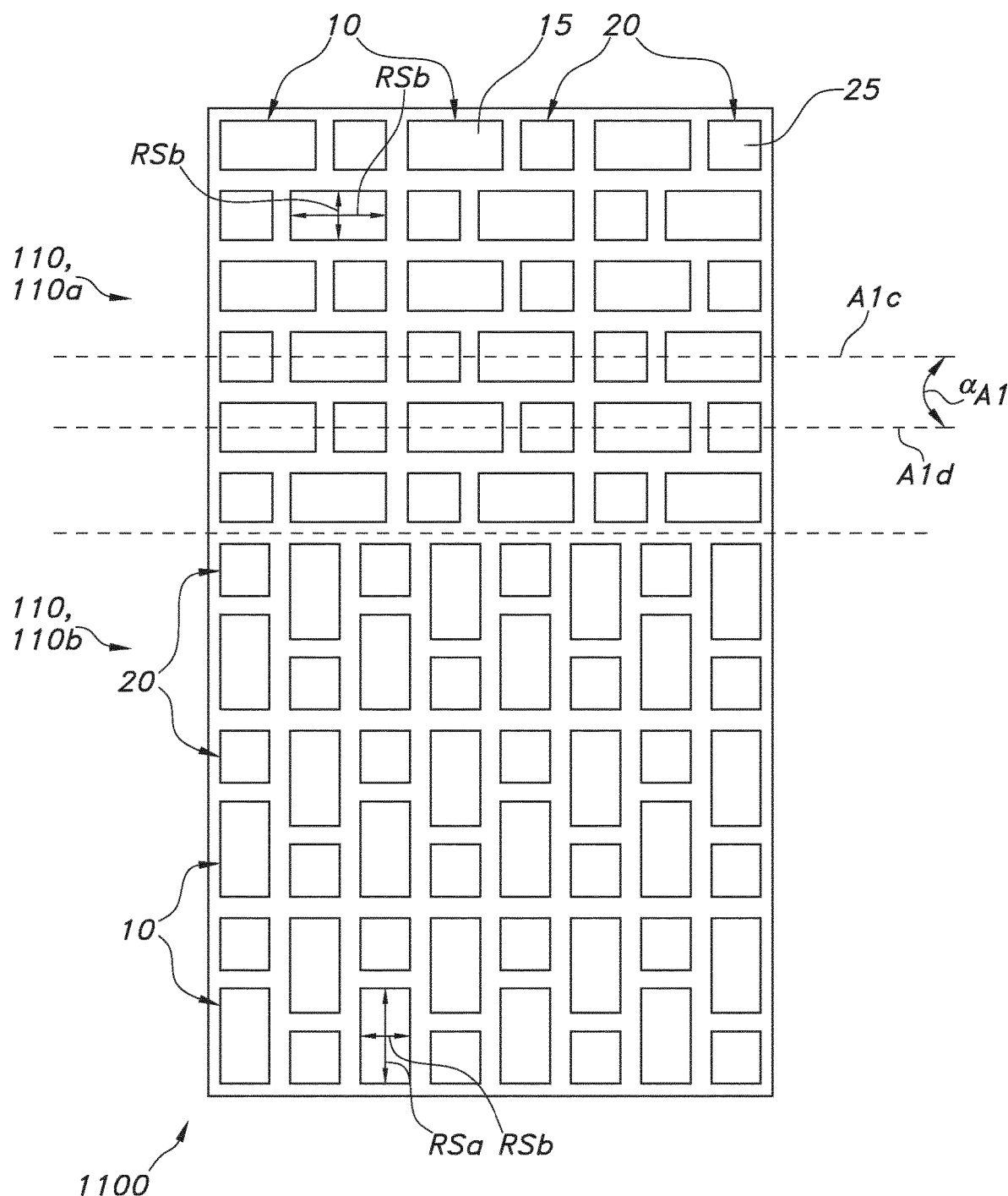

In embodiments, for each of the system sections may apply that each first axis of elongation A1 (of the light emitting surfaces shapes of the plurality of section light sources in the respective system section) has an angle $\alpha_{A1}$ to an averaged first direction of the axes of elongation A1, wherein $\alpha_{A1} \leq 5°$ (also see FIG. 2C). In particular, within each system section 100, the section light sources 10 may be arranged (essentially) in parallel. However, as the system sections 100 may be rotated relative to one another, the first axes of elongation A1 of section light sources 10 of different system sections 100 may be arranged at an angle. For instance, as schematically depicted in FIG. 1A, the first axis of elongation A1*a* of a first light source array section 110*a* may be arranged at an angle of about 90° with the first axis of elongation A1*b* of a second light source array section 110*b*.

In embodiments, for each of the system sections may apply that the section entrance surface pattern 31 (also see FIG. 2A) comprises a section entrance tessellation 33 of an entrance lenslet shape. In embodiments, the entrance lenslet shape may have a rotational symmetry of order $n_A$, wherein $n_A \geq 2$, such as ≥4. In further embodiments, the entrance lenslet shape may have an entrance aspect ratio R1, especially wherein R1≤RS.

In embodiments, for each of the system sections may apply that the section exit surface pattern 36 (also see FIG. 2B) comprises a section exit tessellation 37 of an exit lenslet shape. In further embodiments, the exit lenslet shape may approximate the light emitting surface, especially wherein the exit lenslet shape has an exit aspect ratio R2, wherein R2 is selected from the range of 0.8*RS-1.2*RS.

In further embodiments, at least two system sections 100 of the system sections 100 may be rotated relative to another for a rotation angle $\alpha_R$ with respect to an optical axis O of the lighting system 1000.

In embodiments, $\alpha_R=(360°/n_A)/k+(360°/n_A)*n_I$, wherein $n_I$ is a non-negative integer, and especially wherein k is selected from the range of 2-12, such as from the range of 2-8, especially from the range of 2-4, such as from the range of 2-3, especially about 2. In further embodiments, k may be at least $n_F$. In further embodiments, k may be at most $n_F$.

In further embodiments, $(360/n_A)/12+(360°/n_A)*n_I \leq \alpha_R \leq (360/n_A)/2+(360°/n_A)*n_I$, wherein $n_I$ is a non-negative integer. For example, if the entrance lenslet shape is a regular hexagon, a rotation of $(360/n_A)/2$ (30°) of a vertically oriented hexagon would result in a horizontally oriented hexagon. In contrast, a rotation of $360°/n_A=60°$ ($n_A=6$), which rotation would essentially result in the same shape (with respect to an external reference point). Hence, with respect to an hexagonal entrance lenslet shape a rotation of 30° may be (essentially) identical to a rotation of 90°. However, for example, with respect to rectangular light sources 10, a rotation of 30° may provide a different result than a rotation of 90°. Hence, in embodiments, $\alpha_R$ may be selected such that $\alpha_R$ is not a multiple of $360°/n_A$, such that the section entrance lenslets 132 of the system sections 100 are arranged at an angle (i.e., are not arranged in parallel).

Although in principle any (non-negative) integer value may be selected for $n_f$, a rotation of a shape for 360°, such as for $n_f=n_A$, or, for example, for $n_f=2*n_A$, may essentially be equal to no rotation. Hence, practically, in embodiments. $0 \le (360/n_A)*n_f < 360$. Similarly, in embodiments, $n_f < n_A$.

In embodiments, the light source array sections 110 of the system sections 100 may (together) form a light source array 1100. Similarly, in embodiments, the collimator sections 120 of the system sections 100 may (together) form a collimator 1200. Further, in embodiments, the Koehler integrator sections 130 of the system sections 100 may (together) form a Koehler integrator 1300.

For instance, FIG. 2A schematically depicts an embodiment of the entrance face 131 of a Koehler integrator 1300, wherein the Koehler integrator 1300 comprises two (or more) Koehler integrator sections 130, 130a, 130b, and wherein the section entrance lenslets 132 of the different Koehler integrator sections 130, 130a, 130b are arranged at an angle of $(360°/n_A)/k+(360°/n_A)*n_f$, wherein $n_A=6$ (as the entrance lenslet shape is a regular hexagon), wherein k=2, and wherein $n_f$ is a non-negative integer.

In particular, in the depicted embodiment, $n_F=2$, and the system sections 100 are rotated relative to one another for (about) $(360°/n_A)/n_F$ (i.e., $n_f=0$).

In further embodiments, the entrance lenslet shape may, for instance, be a rectangle. In further embodiments, the entrance lenslet shape may be a non-regular hexagon, such as an elongated hexagon, or such as a non-regular hexagon wherein each set of two opposite sides of the hexagon are arranged in parallel.

Further, in the depicted embodiment, the section entrance lenslet tessellation 33 comprises a translation tessellation of the entrance lenslet shape, i.e., within each system section 100, especially within each Koehler integrator section 130, the tessellation may be provided by moving of the entrance lenslet shape without rotating or mirroring the entrance lenslet shape.

FIG. 2A further schematically depicts the Koehler integrator 1300, especially the Koehler integrator sections 130, comprising a plurality of section entrance lenslets 132 defining the entrance face 131, wherein the plurality of section entrance lenslets 132 are shaped according to the entrance lenslet shapes in the entrance surface pattern 31. In particular, the plurality of section entrance lenslets 132 may approximate the entrance lenslet shapes in the entrance surface pattern 31.

FIG. 2B schematically depicts an embodiment of the exit face 136 of a Koehler integrator 1300, wherein the Koehler integrator 1300 comprises two (or more) Koehler integrator sections 130, 130a, 130b. In particular, for the depicted embodiment, the corresponding light emitting surface in the corresponding light source array section 110 (not depicted) has a rectangular shape, and the exit lenslet shape is also a rectangle. In particular, the exit lenslet shape has a second axis of elongation A2, wherein each second axis of elongation A2 of exit lenslet shapes in the section exit tessellation 37 has an angle $\alpha_{A2}$ to the (mean) averaged first direction of the axes of elongation A1 of the light source array section 110, wherein $\alpha_{A2} \le 5°$. In particular, with regards to the depicted embodiment, each exit lenslet shape in a first Koehler integrator section 130a may have a second axis of elongation A2a, wherein an angle between A2, A2a and a corresponding (mean) averaged first direction of axis of elongation A1a (not depicted) $\le 5°$. Similarly, each exit lenslet shape in a second Koehler integrator section 130b may have a second axis of elongation A2, A2b, wherein an angle between A2b and a corresponding (mean) averaged first direction of axis of elongation A1b (not depicted) $\le 5°$.

In the depicted embodiments, the section exit tessellation 37 of each system section 100, especially of each Koehler integration section 130, comprises a translation tessellation of the exit lenslet shape.

As indicated above the exit lenslet shape may have an exit aspect ratio R2, wherein exit aspect ratio R2 is the ratio of the longest side (here R2a) to the smallest side (here R2b) of the smallest rectangle realization encompassing the shape. As, in the depicted embodiment, the exit lenslet shape is a rectangle, the smallest rectangle realization is the (same) rectangle.

FIG. 2B further schematically depicts the Koehler integrator 1300, especially the Koehler integrator sections 130, comprising a plurality of section exit lenslets 137 defining the exit face 136, wherein the plurality of section exit lenslets 137 are shaped according to the exit lenslet shapes in the exit surface pattern 36. In particular, the plurality of section exit lenslets 137 may approximate the exit lenslet shapes in the exit surface pattern 36.

In further embodiments, the section entrance lenslets 132 and the section exit lenslets 137 may be focused on one another, i.e., the section entrance lenslets 132 and the section exit lenslets 137 may have their focal planes overlapping with an opposite lenslet plane.

FIG. 2C schematically depicts an embodiment of the light source array 1100, wherein the light source array 1100 comprises two (or more) light source sections 110, 110a, 110b. In the depicted embodiment, the light source array sections 110 (of each system section 100) comprise a plurality of second section light sources 20 configured to provide second light source light 21. For visualization purposes only an equal number of light sources 10 and second light sources 20 are depicted. In embodiments, the light source array section 110 may also comprise different numbers of light sources 10 and second light sources 20. Especially, the light sources 10 (and the second light sources 20) may be (essentially) uniformly distributed on the light source array section 110, thereby especially reducing, more especially preventing, color shadowing. As indicated above, the light source array section 110 may in further embodiments also comprise more than two types of light sources, such as white light sources 10, red second light sources 20, and blue third light sources (not depicted). Further, for visualization purposes only, the light sources are depicted (relatively) close together (or relatively large) in the schematic drawing.

In particular, the light source light 11 and the second light source light 21 may have different spectral distributions. Further, in embodiments, the second section light sources 20 may have a (same) second light emitting surface 25, wherein the second light emitting surface 25 may have an aspect ratio RS2, especially wherein RS2≥1, such as ≥1.05, especially ≥1.2, and especially wherein RS2≤1.5, such as ≤1.4, especially ≤1.3, such as 1.1, including 1.0. In further embodiments, RS2≤RS, especially RS2<RS, such as ≤0.9*RS. In the depicted embodiment, RS2 may be (about) 1, such as ≤1.05, especially ≤1.02.

In particular, in such embodiments, each system section may facilitate color mixing (and homogenization) of the light source light 11 and the second light source light 21.

Hence, in embodiments (also see FIG. 3) the system light 1001 may comprise the light source light 11 and the second light source light 21.

In further embodiments, the section light sources 10 may comprise phosphor converted laser emitters.

In further embodiments, the second section light sources 20 may comprise one or more of (i) light emitting diodes or (ii) (bare) laser sources functionally coupled with (respective) diffusers. Especially, the diffusers may have a diffuser exit face with an area ad selected from the range of 0.8-1.2*the area of the light emitting surface (of a corresponding section light source 10).

In particular, in embodiments, the section light sources 10 may be configured to provide (cool) white light source light, and the second section light sources 20 may be configured to provide (red) second light source light having a (dominant) wavelength in the range of 620-750 nm.

Figure 2D:
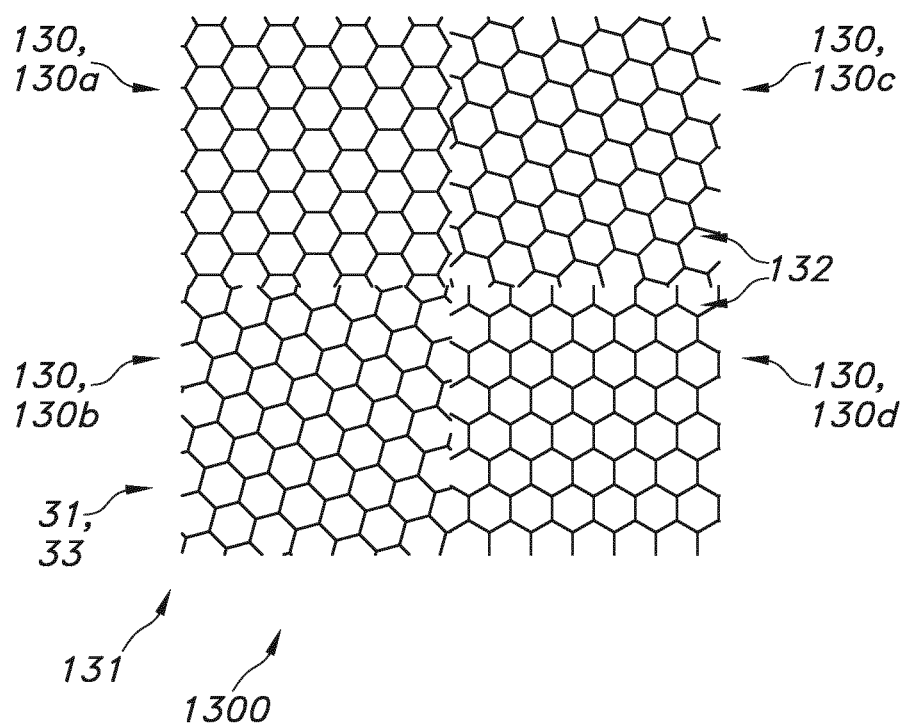

FIG. 2D schematically depicts an embodiment of the lighting system 1000, wherein the lighting system 1000 comprises at least four system sections, i.e., wherein $n_F \geq 4$. In the depicted embodiment, each system section 100 is rotated relative to two other system sections 100 for (about) $360°/n_A/n_F + 360°/n_A*n_F$. In particular, FIG. 2D schematically depicts the Koehler integrator 1300 comprising four Koehler integrator sections 130, 130a, 130b, 130c, 130d, wherein the four Koehler integrator sections are rotated relative to one another.

Figure 3:
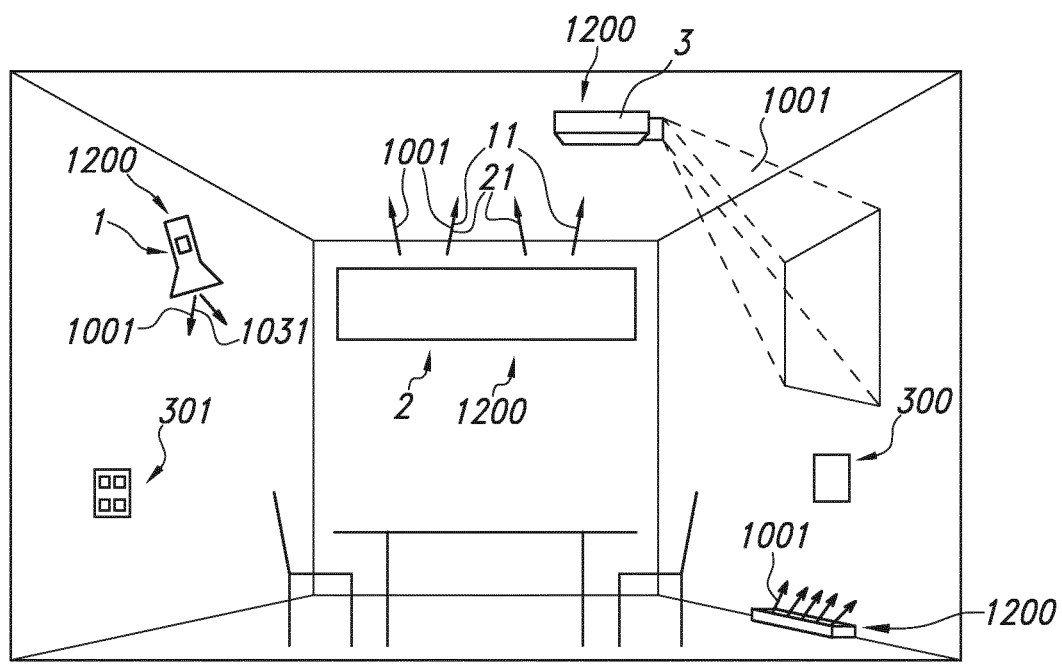
FIG. 3 schematically depicts embodiments of the light generating device.

FIG. 3 schematically depicts an embodiment of the light generating device 1200 comprising the lighting system 1000 according to any one of the preceding claims. The light generating device may especially be selected from the group comprising a lamp 1, a luminaire 2, a projector device 3, a stage lighting device, a chemical reaction stimulation device, and an optical wireless communication device.

Specifically, FIG. 3 schematically depicts an embodiment of a luminaire 2 comprising the light generating device 1200 as described above. Reference 301 indicates a user interface which may be functionally coupled with a control system 300 comprised by or functionally coupled to the lighting device 1200. FIG. 3 also schematically depicts an embodiment of a lamp 1, especially a spot, comprising the lighting device 1200. Reference 3 indicates a projector device or projector system, which may be used to project images, such as at a wall, which may also comprise the light generating device 1200. Hence, reference 1200 refers to a light generating device, which may e.g., be selected from the group of a lamp 1, a luminaire 2, a projector device 3. The light generating device 1200 may comprise the lighting system 1000. FIG. 3 also schematically depicts an embodiment of the light generating device 1200 comprising a wall light device (such as especially wall washers). The light generating device 1200 may also comprise a cove lighting device (for illuminating a cove). In further embodiments, the light generating device 1200 may especially comprise entertainment lighting or architectural lighting.

Hence, in embodiments, the lighting system 1000 may comprise one or more of an entertainment lighting fixture, such as a spotlight fixture, and an architectural lighting fixture.

Figure 4:
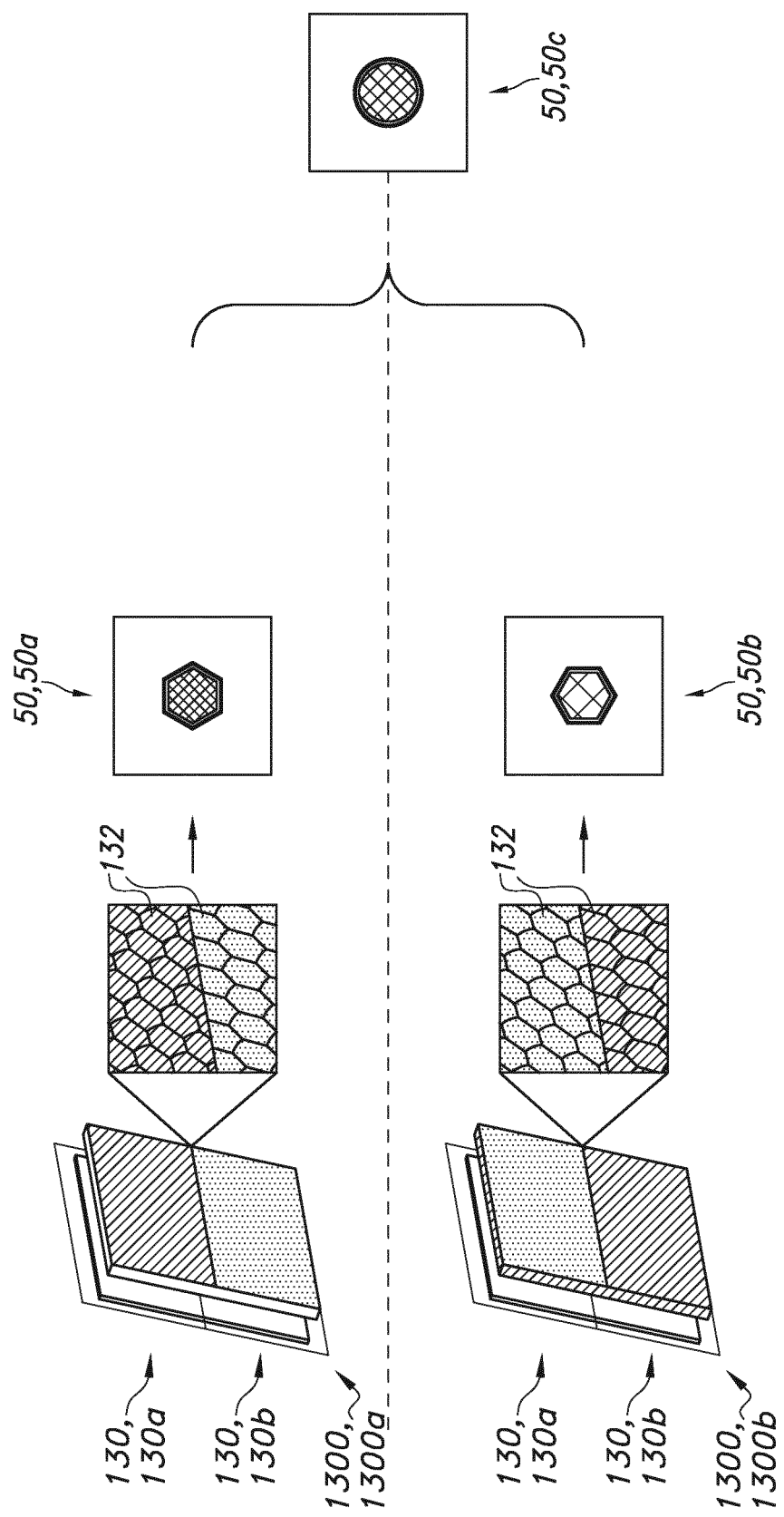
FIG. 4 schematically depicts simulated results based on the lighting system of the invention.

FIG. 4 schematically depicts computational simulations based on the lighting system 1000 of the invention. In particular, FIG. 4 schematically depicts two sets of (same) Koehler integrators 1300, each comprising two Koehler integrator sections 130, 130a, 130b. In the top half of the figure, corresponding to a first Koehler integrator 1300, 1300a, the bottom Koehler integrator section 130, 130b is blocked (with respect to light), whereas in the bottom half of the figure, corresponding to a second Koehler integrator 1300, 1300b, the top Koehler integrator section 130, 130a is blocked (with respect to light). Further, FIG. 4 schematically depicts the section entrance lenslets 132, wherein the section entrance lenslets 132 have a spherical shape, and wherein the section entrance lenslets 132—in-plane—approximate the hexagonal entrance section shape.

The first illumination profile 50, 50a schematically depicts the simulated illumination of a panel with the first Koehler integrator 1300, 1300a, whereas second illumination profile 50, 50b schematically depicts the simulated illumination of a panel with the second Koehler integrator 1300, 1300b. In both cases, the illumination profiles indicate that the illumination of the panel, and thus of the shaped light beam 1031, would have an hexagonal shape, which hexagonal shapes are rotated relative to one another in line with the rotation of the (Koehler integrator sections of the) system sections 100. The third illumination profile 50, 50c schematically depicts the simulated illumination of a panel with a (same) Koehler integrator 1300 for which neither Koehler integrator section 130 is blocked, which illumination profile corresponds to a shaped light beam 1031 having a rounded shape, i.e. the shaped light beam 131 may approximate (or "be") a circle.

In further embodiments, the shaped light beam 1031 may approximate a shape selected from the group comprising a circle, an ellipse, a rectangle, a hexagon, and a star.

The term "plurality" refers to two or more.

The terms "substantially" or "essentially" herein, and similar terms, will be understood by the person skilled in the art. The terms "substantially" or "essentially" may also include embodiments with "entirely", "completely", "all", etc. Hence, in embodiments the adjective substantially or essentially may also be removed. Where applicable, the term "substantially" or the term "essentially" may also relate to 90% or higher, such as 95% or higher, especially 99% or higher, even more especially 99.5% or higher, including 100%.

The term "comprise" includes also embodiments wherein the term "comprises" means "consists of".

The term "and/or" especially relates to one or more of the items mentioned before and after "and/or". For instance, a phrase "item 1 and/or item 2" and similar phrases may relate to one or more of item 1 and item 2. The term "comprising" may in an embodiment refer to "consisting of" but may in another embodiment also refer to "containing at least the defined species and optionally one or more other species".

Furthermore, the terms first, second, third and the like in the description and in the claims, are used for distinguishing between similar elements and not necessarily for describing a sequential or chronological order. It is to be understood that the terms so used are interchangeable under appropriate circumstances and that the embodiments of the invention described herein are capable of operation in other sequences than described or illustrated herein.

The devices, apparatus, or systems may herein amongst others be described during operation. As will be clear to the person skilled in the art, the invention is not limited to methods of operation, or devices, apparatus, or systems in operation.

It should be noted that the above-mentioned embodiments illustrate rather than limit the invention, and that those skilled in the art will be able to design many alternative embodiments without departing from the scope of the appended claims.

In the claims, any reference signs placed between parentheses shall not be construed as limiting the claim.

Use of the verb "to comprise" and its conjugations does not exclude the presence of elements or steps other than those stated in a claim. Unless the context clearly requires otherwise, throughout the description and the claims, the words "comprise", "comprising", and the like are to be construed in an inclusive sense as opposed to an exclusive or exhaustive sense: that is to say, in the sense of "including, but not limited to".

The article "a" or "an" preceding an element does not exclude the presence of a plurality of such elements.

The invention may be implemented by means of hardware comprising several distinct elements, and by means of a suitably programmed computer. In a device claim, or an apparatus claim, or a system claim, enumerating several means, several of these means may be embodied by one and the same item of hardware. The mere fact that certain measures are recited in mutually different dependent claims does not indicate that a combination of these measures cannot be used to advantage. In yet a further aspect, the invention (thus) provides a software product, which, when running on a computer is capable of bringing about (one or more embodiments of) the method as described herein.

The invention also provides a control system that may control the device, apparatus, or system, or that may execute the herein described method or process. Yet further, the invention also provides a computer program product, when running on a computer which is functionally coupled to or comprised by the device, apparatus, or system, controls one or more controllable elements of such device, apparatus, or system.

The invention further applies to a device, apparatus, or system comprising one or more of the characterizing features described in the description and/or shown in the attached drawings. The invention further pertains to a method or process comprising one or more of the characterizing features described in the description and/or shown in the attached drawings.

The various aspects discussed in this patent can be combined in order to provide additional advantages. Further, the person skilled in the art will understand that embodiments can be combined, and that also more than two embodiments can be combined. Furthermore, some of the features can form the basis for one or more divisional applications.

The invention claimed is:

1. A lighting system configured for providing a beam of light having a predefined shape, wherein the lighting system comprises $n_F$ system sections, wherein $n_F \geq 2$, wherein each system section comprises a light source array section, a collimator section, and a Koehler integrator section, wherein:
   for each of the system sections applies:
      the light source array section comprises a plurality of section light sources configured to provide light source light;
      the Koehler integrator section comprises a section entrance face and a section exit face, wherein the section entrance face comprises a plurality of section entrance lenslets shaped according to an section entrance surface pattern, and wherein the section exit face comprises a plurality of section exit lenslets shaped according to a section exit surface pattern, and wherein the section entrance face is configured in a light receiving relationship with the plurality of section light sources via the collimator section;
      each of the plurality of section light sources have a light emitting surface, wherein the light emitting surface has a first axis of elongation A1 and an aspect ratio RS, wherein RS>1;
      each first axis of elongation A1 has an angle $\alpha_{A1}$ to an averaged first direction of the axes of elongation A1, wherein $\alpha_{A1} \leq 5°$;
      the section entrance surface pattern comprises a section entrance tessellation of an entrance lenslet shape, wherein the entrance lenslet shape has a rotational symmetry of order $n_A$, wherein $n_A \geq 2$, wherein the entrance lenslet shape has an entrance aspect ratio R1, and wherein R1≤RS;
      the section exit surface pattern comprises a section exit tessellation of an exit lenslet shape, wherein the exit lenslet shape approximates the light emitting surface by being superimposable such that an intersection between the exit lenslet shape and the light emitting surface covers at least 90% of the exit lenslet shape and at least 90% of the light emitting surface, wherein the exit lenslet shape has an exit aspect ratio R2, wherein R2 is selected from the range of 0.8*RS-1.2*RS; and
   at least two system sections of the system sections are rotated relative to another for $(360°/n_A)k+(360/*n_A)*n_I$ for improving the roundedness of the beam of light, wherein $n_I$ is a non-negative integer, and wherein k is selected from the range of 2-12, and
   wherein the aspect ratio RS of a shape is defined as the ratio of the longest side to the smallest side of the smallest rectangle realization encompassing the shape.

2. The lighting system according to claim 1, wherein the entrance lenslet shape is selected from the group comprising a hexagon and a rectangle.

3. The lighting system according to claim 1, wherein the section entrance tessellation comprises a translation tessellation of the entrance lenslet shape.

4. The lighting system according to claim 1, wherein $n_A \geq 4$.

5. The lighting system according to claim 1, wherein the light emitting surface 15 is a rectangle, and wherein the exit lenslet shape is a rectangle, wherein the exit lenslet shape has a second axis of elongation A2, wherein each second axis of elongation A2 of exit lenslet shapes in the section exit tessellation has an angle $\alpha_{A2}$ to the averaged first direction of the axes of elongation A1, wherein $\alpha_{A2} \leq 5°$.

6. The lighting system according to claim 1, wherein the section exit tessellation comprises a translation tessellation of the exit lenslet shape.

7. The lighting system according to claim 1, wherein $\alpha_{A1} \leq 1°$, wherein RS≥1.3, and wherein R1≤1.2.

8. The lighting system according to claim 1, wherein $n_F \geq 3$, and wherein each system section is rotated relative to two other system sections for $(360°/n_A)/n_F+(360°/n_A)*n_I$.

9. The lighting system according to claim 1, wherein $n_F=2$, wherein the system sections are rotated relative to one another for $(360°/n_A)/n_F$.

10. The lighting system according to claim 1, wherein the light source array section comprises a plurality of second section light sources configured to provide second light source light, wherein the light source light and the second light source light have different spectral distributions, and wherein the second section light sources have a second light emitting surface, wherein the second light emitting surface has aspect ratio RS2, wherein RS2≥1.

11. The lighting system according to claim 10, wherein the section light sources comprise phosphor converted laser emitters, and wherein:

the second section light sources comprise light emitting diodes; or the second section light sources comprise laser sources functionally coupled with diffusers.

12. The lighting system according to claim 10, wherein the section light sources are configured to provide white light source light, and wherein the second section light sources are configured to provide second light source light having a wavelength in the range of 620-750 nm.

13. The lighting system according to claim 1, wherein:
the light source array sections of the system sections form a light source array;
the collimator sections of the system sections form a collimator; and
the Koehler integrator sections of the system sections form a Koehler integrator.

14. The lighting system according to claim 1, wherein the lighting system comprises one or more of an entertainment lighting fixture and an architectural lighting fixture.

15. A light generating device selected from the group of a lamp (1), a luminaire (2), a projector device (3), a disinfection device, a stage lighting device, a chemical reaction stimulation device, and an optical wireless communication device, comprising the lighting system according to claim 1.

* * * * *